(12) United States Patent
Kindelspire et al.

(10) Patent No.: US 11,089,799 B2
(45) Date of Patent: Aug. 17, 2021

(54) FOOD PRODUCTS THAT CONTAIN ZEIN, AND RELATED METHODS

(71) Applicant: POET Research, Inc., Sioux Falls, SD (US)

(72) Inventors: Julie Y. Kindelspire, Sioux Falls, SD (US); Timothy J. Anderson, Baytown, TX (US); Sharil Kirschman-Rollag, Beaver Creek, MN (US)

(73) Assignee: POET Research, Inc., Sioux Falls, SD (US)

( * ) Notice: Subject to any disclaimer, the term of this patent is extended or adjusted under 35 U.S.C. 154(b) by 31 days.

(21) Appl. No.: 15/743,863

(22) PCT Filed: Jul. 14, 2016

(86) PCT No.: PCT/US2016/042204
§ 371 (c)(1),
(2) Date: Jan. 11, 2018

(87) PCT Pub. No.: WO2017/011625
PCT Pub. Date: Jan. 19, 2017

(65) Prior Publication Data
US 2018/0199591 A1    Jul. 19, 2018

Related U.S. Application Data

(60) Provisional application No. 62/192,850, filed on Jul. 15, 2015.

(51) Int. Cl.
*A23J 1/12* (2006.01)
*A23J 3/26* (2006.01)
(Continued)

(52) U.S. Cl.
CPC . *A23J 1/12* (2013.01); *A23J 3/26* (2013.01); *A23L 7/161* (2016.08); *A23L 7/17* (2016.08);
(Continued)

(58) Field of Classification Search
CPC .................................. A23P 30/34; A23L 7/17
See application file for complete search history.

(56) References Cited

U.S. PATENT DOCUMENTS 6,607,772 B1    8/2003    Bortone
6,722,873 B2    5/2004    Bortone
(Continued)

FOREIGN PATENT DOCUMENTS

CN    101 273 762 A    10/2008
EP    1 241 946 B1    12/2006
(Continued)

OTHER PUBLICATIONS

Begum, et al. "Comparative study on the development of maize flour based on composite bread". J. Bangladesh Agril. Univ. 11 (1): 133-139, 2013. (Year: 2013).*
(Continued)

*Primary Examiner* — Jenna A Watts
(74) *Attorney, Agent, or Firm* — Kagan Binder, PLLC

(57) ABSTRACT

Described are food products including doughs, extrudates, and finished food products derived therefrom, that contain zein protein, e.g., zein protein ingredient, wherein the zein protein improves processing or textural characteristics of the food product.

29 Claims, 6 Drawing Sheets

(51) Int. Cl.
*A23P 30/34* (2016.01)
*A23L 19/00* (2016.01)
*A23L 7/17* (2016.01)
*A23L 7/161* (2016.01)
*A23P 30/30* (2016.01)

(52) U.S. Cl.
CPC .............. *A23L 19/09* (2016.08); *A23P 30/30* (2016.08); *A23P 30/34* (2016.08); *A23V 2002/00* (2013.01); *A23V 2200/14* (2013.01); *A23V 2250/5118* (2013.01); *A23V 2250/5482* (2013.01)

(56) References Cited

U.S. PATENT DOCUMENTS

| | | |
|---|---|---|
| 6,797,213 B2 | 9/2004 | Bortone et al. |
| 7,235,276 B2 | 6/2007 | Allen et al. |
| 2005/0064080 A1 | 3/2005 | Creighton et al. |
| 2006/0019009 A1 | 1/2006 | Keller et al. |
| 2009/0155447 A1 | 6/2009 | Moore et al. |
| 2009/0304861 A1 | 12/2009 | Hamaker et al. |
| 2010/0003393 A1 | 1/2010 | Torney et al. |
| 2010/0178675 A1 | 7/2010 | Lawton, Jr. et al. |
| 2011/0143013 A1 | 6/2011 | Lawton, Jr. |
| 2011/0200736 A1 | 8/2011 | Yakubu et al. |
| 2013/0040040 A1 | 2/2013 | Fannon et al. |
| 2015/0201647 A1 | 7/2015 | Fosdick et al. |

FOREIGN PATENT DOCUMENTS

| | | |
|---|---|---|
| WO | 01/45517 A1 | 6/2001 |
| WO | 2007/060549 A2 | 5/2007 |
| WO | 2007/070616 A2 | 6/2007 |
| WO | 2007/106731 A2 | 9/2007 |

OTHER PUBLICATIONS

Zhang, et al. "Physical, Functional and Sensory Characteristics of Cereal Extrudates". Published online Jun. 23, 2014. International Journal of Food Properties, 17:9, 1921-1933. (Year: 2014).*

Frohlich, et al. "Pulse Ingredients as Healthier Options in Extruded Products". Available online from Cereal Foods World, May-Jun. 2014, vol. 59, No. 3. pp. 1-6. (Year: 2014).*

Lee, "Grains with the highest lysine". Available online as of Dec. 12, 2018 from https://healthyeating.sfgate.com. pp. 1-4. (Year: 2018).*

* cited by examiner

> US 11,089,799 B2

FOOD PRODUCTS THAT CONTAIN ZEIN, AND RELATED METHODS

PRIORITY CLAIM

This application claims benefit from International Application No. PCT/US2016/042204, filed Jul. 14, 2016, which in turn claims priority to U.S. Provisional Patent Application No. 62/192,850, filed Jul. 15, 2015 and title "ZEIN AS A PUFFING AGENT AND TEXTURIZER" both of which are incorporated herein by reference in their entireties for all purposes.

FIELD OF THE INVENTION

The invention relates to food products that contain zein protein, including puffed or extruded food products, preferably with the zein providing an improved textural characteristic of the food product such as by reducing hardness.

BACKGROUND

Ready-to-eat food products are popular among consumers because of their convenience, flavor, texture, ease of preparation (if any) and storage stability. Ready-to-eat food products include dry cereals and snack foods that are packaged and sold to consumers, and can be served when desired, by the consumer opening (or re-opening) the package and removing the food product from the container with little or no preparation. The packaged food product is relatively dry and will maintain freshness for an extended shelf-life, especially before the package is opened.

One type of ready-to-eat food product is the "puffed" food product (e.g., extruded food products) such as puffed dry cereals, and puffed snacks. This includes Cheerios®, Kix®, Cheetos®, and other corn-puff snack foods. Puffed food products are prepared by forming a dough, which contains a water component, and extruding the dough under pressure. The extruded dough expands or "puffs" when the pressure is released, and forms an expanded matrix of the dough that includes a cellular structure of cell walls that define internal spaces. This extruded dough piece can be further processed to remove most of the water from the dough and dry the dough into a puffed food piece.

Textural characteristics of the expanded and dried, puffed food piece are very important to a consumer. These include crispiness or crunchiness, hardness, and density, and are critical features of a good-tasting and organoleptically desirable, commercially accepted, puffed food product, versus one that is not appealing to consumers and not commercially successful. Also of great importance, the food piece must have good flavor and appearance (e.g., color), and, in certain particular or specialized food products a consumer may also look for nutritional traits such as a high protein content, low carbohydrates, reduced or no-gluten, or a high fiber content.

Puffed food products are typically produced by extrusion or other expansion techniques, e.g., by being directly expanded, by being gun puffed. The formulation of the food product (i.e., its ingredients) and the processing technique and conditions will determine the textural characteristics of being crispy or crunchy, hard, of a high or low density.

Ready-to-eat (RTE) foods, including puffed RTE food products, are usually starch-based products and contain high levels of carbohydrates. Therefore, these products are usually not considered "healthy foods." There have been various attempts to reduce the level of starch in puffed food products by developing high fiber or high protein puffed RTE foods, but the addition of either protein or fiber has been found to typically affect the texture characteristics of the finished product by making the puffed food piece excessively hard and dense, and not appealing to the consumers.

Because of the constant interest in providing new or improved food products in terms of textural and nutritional characteristics, the food industry continues to research newly identified food ingredients and their use in food production processes. One such ingredient is zein protein, which has been described as being potentially useful in food products. See United States Patent Publications 2015/0201647 (the '647 application) and 2011/0143013 (the '013 application), the entireties of these documents being incorporated herein by reference. As described herein, new and useful food formulations have been discovered that include zein protein.

SUMMARY

Figure 1:
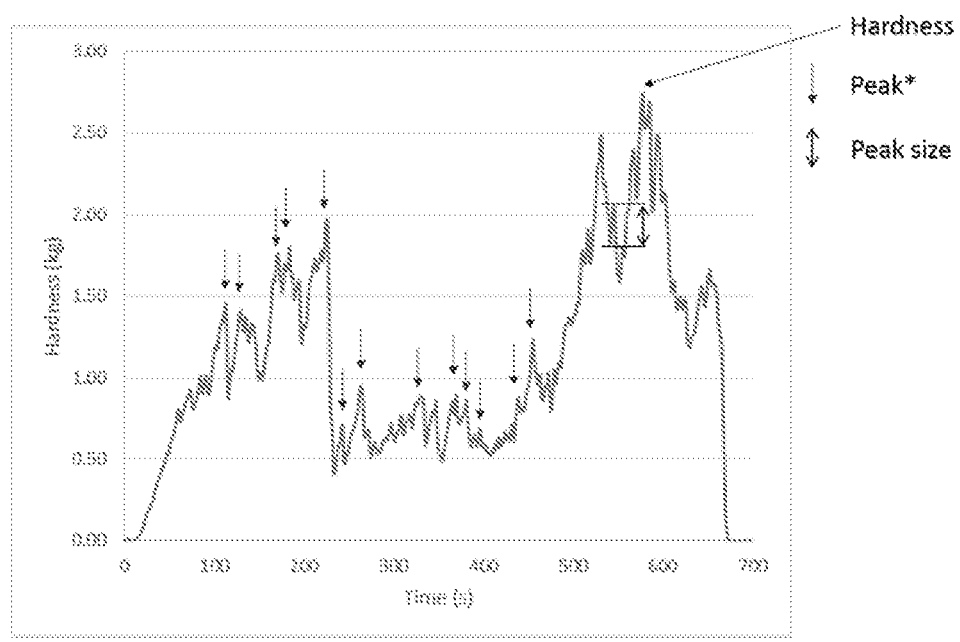
FIG. 1 shows an example of data measured using a texture analyzer.

Ongoing demand exists for new food ingredients that may be useful or advantageous in providing good nutrition, flavor, textural characteristics, low cost, and good properties for manufacturing, and that can be efficiently prepared on a commercial scale. For puffed foods, important requirements include good processability, flavor, and textural properties. In some instances, consumers may also look for food products that are low in gluten or that are gluten-free, that contain reduced or low amounts of carbohydrates, or that are relatively high in protein and fiber. Ingredients that allow for a puffed food product that has highly desirable textural properties, processability, flavor, and, preferably, reduced gluten, low carbohydrates, or high fiber, are highly desired.

Zein can be prepared to be generally regarded as safe (GRAS) for food applications, and has been identified as potentially useful in food products. But its use as a food ingredient has not become widespread. As described herein, the Applicant has now discovered that zein protein can be useful or advantageous when used to prepare food products, especially expanded (e.g., puffed) food products. Most food ingredient systems, including those of expanded food products, are water-based. Within the system, ingredients such as starch and protein compete for water and the distribution of water among the ingredients is a function of the water absorption rate of each ingredient. In extruded products, starch gelatinization is a critical factor in expanding the dough to a finished, low density food product with good textural characteristics. Thus, starch is a main contributor of expansion. In competition for water with starch, are proteins. Different types of proteins may be water soluble, insoluble, or may have a high water binding capacity. Proteins that are water soluble or have a high water binding capacity will compete with starch for water in a dough. Fiber ingredients may also compete with starch for the water in the food system. If the fiber or the protein ingredient hydrates or binds to water before the water can be used to hydrate the starch, less starch will be hydrated and the quality of the finished product will be negatively affected.

As has now been identified by the Applicant and as is described herein, zein protein, as compared to other types of protein, when included in a dough at high levels, e.g., up to 40 weight percent (on a dry basis), and the dough is capable of being expanded, e.g., extruded, to produce a puffed food product with good or highly desirable textural characteristics. Without wishing to be bound by theory, zein is not water-soluble (has limited solubility in water), while many other proteins are more soluble in water. Zein protein, therefore, compared to other proteins, will compete less with starch for water. In a dough that contains the less soluble zein protein, more of the starch present in the composition will become hydrated and gelatinized, and will contribute to expansion and textural properties of the expanded food piece. While doughs with high levels of non-zein protein ingredient become difficult to process into puffed products, e.g., by extrusion, Applicant has identified that doughs that contain up to 40 weight percent zein protein ingredient may be formed into puffed food products, e.g., by extrusion techniques, using process conditions that are similar to those used to prepare puffed food products from doughs that contain lower amounts of protein ingredient. Thus, food products can be produced using very high levels of zein protein ingredient.

Zein protein, however, has low levels of both lysine and tryptophan, and its nutritional value may be below what is often needed or desired in a commercial food product. To provide a food product with higher nutritional value than one would have with zein protein used as a sole protein ingredient, various embodiments of food products of the present description contain zein protein ingredient in combination with another non-zein protein ingredient such as soy protein isolate (SPI), pea protein isolate (PPI), whey, or the like, which have desired nutritional profiles. Expanded food products made from such non-zein protein ingredients alone have been found to have poor organoleptic characteristics, e.g., unappealing textural characteristics, and are not well accepted by consumers. A combination of zein protein ingredient and non-zein protein ingredient can provide desired processing, textural, and nutritional properties.

The zein protein ingredient can function as a processing aid to improve one or more textural properties of a food product, especially in a food product that contains a relatively high amount of total protein ingredient (total zein protein ingredient and non-zein protein ingredient) and also, optionally, a relatively high amount of fiber. The addition of zein protein ingredient to food product recipes (e.g., puffed snack foods, dry cereal) can result in decreased hardness, decreased bulk density, improved crunch or crispiness as measured by "peak count" or "peak size" or both, and an increase in expansion (as measured by expansion ratio) during preparation of the food product by extrusion or another expansion technique. Because the zein protein ingredient contributes to the structure of the puffed food, the finished puffed food products also exhibited good cellular structure. Also, in addition to processing and textural properties, the use of relatively higher levels of zein protein in a food product can produce useful or advantageous nutritional content in a puffed food product: zein protein ingredient can effectively replace and reduce the relative amounts of other less desired, less nutritional ingredients such as sugars, starches, gluten, carbohydrates, or undesired fiber ingredients such as cereal bran, whole grain flours, etc., while still resulting in a puffed food product having useful processing, taste, and textural characteristics.

Accordingly, certain embodiments of food products of the invention include zein protein ingredient in a puffed food product, optionally in combination with non-zein protein ingredient, with the zein protein ingredient having an effect of improving one or a combination of: dough expansion during preparation (i.e., expansion ratio), bulk density (reduced) in a finished puffed product, and one or more desired textural characteristics in a finished product such as desired bulk density, hardness, "peak size," and "peak count." One or a combination of these properties can be improved in a puffed food composition by including the zein protein ingredient either alone or in combination with non-zein protein ingredient.

Useful or improved properties of a dough or food product as described herein include processing properties of a dough being prepared into an expanded food product, including expansion ratio, as well as properties of a finished (expanded and dried) food product, including bulk density and textural properties that include hardness, peak size, and peak count.

The expansion ratio of a puffed or expanded food product is a measure of the expansion of a volume of dough that occurs when the dough is expanded (e.g., puffed, extruded, etc.) from the form of an essentially continuous (non-cellular) dough, to the form of a reduced density dough that has a cellular structure of a matrix defined by cell walls separated by spaces or pores. The degree of expansion, which relates directly to product density, is an important quality parameter for expanded products. The degree of expansion (i.e., expansion ratio) can be evaluated by calculating the sectional expansion ratio of an extrudate of a dough, during extrusion, using the following equation (an average value is generally reported):

$$\text{Cross sectional expansion ratio} = (\text{diameter of extrudate piece})/(\text{diameter of die opening})$$

Bulk density of a puffed food piece is a measure of weight per volume of a food piece, e.g., grams per cubic centimeter. Bulk density is related to expansion ratio in that both relate to the cellular structure of an expanded food product. Bulk density of a dried food product can be measured using a volume displacement method, various examples of which are well, known. One method, for example using mustard seeds, is described in the present application hereinbelow.

Textural characteristics of an expanded food product can be related to the cellular structure of the food product, and can have an effect on sensory attributes of the food product. Texture analysis (the measurement of textural characteristics) can be performed by objective measurements using known techniques and equipment designed or useful for this purpose, such as a Texture Analyzer available from Texture Technologies, Scarsdale N.Y. See the discussion of textural analysis in the examples section, below.

Three specific textural characteristics that are useful to characterize an expanded food product are: hardness, peak count, and peak size. Hardness refers to the force require to break the food piece, and is indicative of the amount of force required to bite the extrudate between molars of a person consuming the food piece. "Peak count" is indicative of the extrudate cellular structure. A high peak count indicates that a food piece has a fairly even and uniform cellular structure, which can be desirable for consumers; a low peak count indicates a food product has either a very dense cellular structure or a cellular structure with a smaller number of larger cells as opposed to a large number of uniform small cells, either of which may be not desired by consumers. Peak size is indicative of the thickness of the cell walls within the matrix of the extrudates. Small peak size indicates thinner cell walls—the food product will most likely be more porous and have a lower bulk density (for example, a Kix® cereal food pieces would have a small peak size). A high peak size is indicative of thicker cell walls—the food product will be less porous (will have relatively smaller cells) and will have a higher bulk density (for example, a Cheerios® cereal food piece would have a high peak size). A product with a small peak size could be described as crispy food (Kix) while a Cheerio would be described as a crunchy food.

One or more of these textural properties, bulk density, or expansion ratio, of an expanded (e.g., puffed) food product of the invention, which contains zein protein ingredient as described, may be improved relative to an expanded food product that is otherwise identical in terms of its formulation (ingredients) and processing but that does not include the zein protein ingredient. Additionally or alternatively, the expanded food product may have one or more of these properties that is improved relative to an expanded food product that is otherwise identical in terms of its formulation (ingredients) and processing, but that instead of an amount of the zein protein ingredient includes an equal amount of non-zein protein ingredient such as vital wheat gluten (VG), soy protein isolate (SPI), or another non-zein protein ingredient. According to and inclusive of the latter, exemplary inventive food products can contain a total amount of protein ingredient that is a combination of zein protein ingredient and non-zein protein ingredient; one or more textural properties of that food product can be improved relative to a comparable food product that includes the same amount of total protein ingredient, wherein the total amount of protein ingredient does not include any zein protein ingredient, e.g., the total amount of protein ingredient is all non-zein protein ingredient such as vital wheat gluten, soy protein isolate, etc., or a combination of two or more different non-zein protein ingredients.

Preferred food products as described herein can exhibit an expansion ratio that is increased by at least 5, 10, 20, 30, or 40 percent relative to the expansion ratio of a food product that is otherwise the same in terms of its formulation and processing but does not contain zein protein ingredient. Additionally or alternatively, a preferred food product may exhibit an increased expansion ratio compared to the expansion ratio of a food product that is otherwise identical but that instead of the zein protein ingredient contains an equal amount of either vital wheat gluten (VG) or soy protein isolate (SPI), the expansion ratio of the inventive food product being higher by, for example, 5 or 10 percent relative to the product that contains the VG or SPI. While the expansion ratio of a food product will vary depending on the desired bulk density, crunchiness, or crispiness of the finished food piece, expansion ratios of example food products as described may be at least 2.2, e.g., at least 2.3, 2.4, or 2.5, or greater.

Additionally or alternatively, example food products can also exhibit a bulk density that is lower by at least 10, 15, or 20 percent relative to a food product that is otherwise the same in terms of its formulation and processing, but does not contain zein protein ingredient, i.e., a bulk density that is less than 90, 85, or 80 percent of the bulk density of the product that does not contain zein protein ingredient. Additionally or alternatively, preferred food products can exhibit a bulk density that is reduced compared to the bulk density of a food product that is otherwise identical but that instead of zein protein ingredient contains an equal amount of either vital wheat gluten (VG) or soy protein isolate (SPI), the bulk density of the inventive food product being lower by at least 5, 10, or 20 percent relative to the product that contains the VG or SPI, i.e., a bulk density that is less than 95, 90, or 80 percent of the bulk density of the product that contains the VG or the SPI. While bulk density of a food product can vary as desired depending on the type of food product and the desired crunchiness and crispiness of the finished food piece, bulk density values of certain example food products as described may be below about 0.25 or below about 0.20, e.g., below 0.18, or below 0.16 or 0.15 grams per milliliter.

Preferred food products can exhibit a "hardness" (in kilograms, and measured as described herein) that is lower by at least 10, 20, or 30 percent relative to a food product that is otherwise the same in terms of its formulation and processing, but does not contain zein protein ingredient, i.e., a hardness that is less than 90, 80, or 70 percent of the hardness of the product that does not contain zein. Additionally or alternatively, preferred food products can exhibit a hardness that is reduced compared to the hardness of a food product that is otherwise identical but that instead of zein protein ingredient contains an equal amount of either vital wheat gluten (VG) or soy protein isolate (SPI), the hardness of the inventive food product being lower by at least 10, 20, 40, or 50 percent relative to the product that contains the VG or SPI, i.e., a hardness that is less than 90, 80, 60, or 50 percent of the hardness of the product that contains the VG or the SPI. While hardness of a food product can vary as desired depending on the type of food product and the desired density, crunchiness, and crispiness of the finished food piece, hardness values of certain food products as described may be below about 3 kilograms, e.g., below 2.5 kilograms, or below 2.1 kilograms.

The food product, in the form of a dough, an extrudate, or a finished (e.g., expanded and dried) food product, can be prepared by combining ingredients that contain starch (from a flour component), zein protein (typically including a zein protein ingredient), and optionally and preferably an amount of non-zein protein ingredient. To provide especially useful processing properties of a dough and mechanical and textural characteristics of a finished food product, example food products can contain at least 40 weight percent flour component and from 5 to 40 weight percent zein protein (from all sources), based on total weight food product (on a dry basis, i.e., "dry"). Example food product can contain from about 40 to about 70 weight percent starch (from all sources), from about 10 to about 40 weight percent total protein (from all sources), based on total weight food product (dry), wherein the food product is also formulated to contain from 3 to 25 weight percent zein protein (from all sources) and from 5 to 25 weight percent non-zein protein (from all sources) based on total weight food product (dry). In terms of amounts of zein protein and non-zein protein ingredients, certain examples food products can include contain from 3 to 20 weight percent zein protein ingredient and from 10 to 30 weight percent non-zein protein ingredient based on total weight food product (dry)—e.g.: from 40 to 70 weight percent flour ingredient (or flour component), from 5 to 20 weight percent zein protein ingredient, and from 5 to 25 weight percent non-zein protein ingredient, based on total weight food product (dry).

In one aspect, the invention relates to a food product that includes: flour component comprising starch and protein; and zein protein in an amount effective to improve a textural characteristic of the puffed food product selected from: hardness, peak count, and peak size. The food product can be a dough, an extrudate, or a finished (extruded and dried) food product.

In another aspect, the invention relates to methods of preparing a food product. The method includes: providing a dough as described herein, e.g., comprising flour component, comprising starch and protein, and zein protein; and expanding the dough to an expanded food product.

DETAILED DESCRIPTION

The following description relates to food products and food processing methods that use zein protein as a food ingredient, i.e., that include a zein protein ingredient. According to the present invention, a food composition (including a dough or a finished food product prepared from the dough) includes zein protein (from a zein protein ingredient, or from another ingredient such as corn flour) in an amount of that will improve a property of the food product either during or of the finished food product. The zein protein may improve the expansion ratio of a dough during processing. Alternately, or additionally, the zein protein may provide a desired mechanical property or textural characteristic of a finished food product prepared from the dough by expanding the dough.

With respect to nutritional properties of the food product, the use of zein protein ingredient to improve processability or textural characteristics of the finished products (relative to otherwise similar food products that contain comparable amounts of non-zein protein ingredients), allows for a food product that may contain a relatively high amount of total protein, meaning a relatively high amount of protein of all types (zein protein plus non-zein protein) present from all sources. If desired, a food product can contain up to about 40 weight percent total protein based on total weight of the food product (on a dry basis). Protein is typically included in a food product at least in part for its nutritional value. But the protein must also be suitable for processing the food product, e.g., from a dough, into a finished food product that is acceptable to consumers, meaning the food product has desired taste and texture properties. As described herein, the present Applicant has discovered that zein protein, especially a zein protein ingredient, can be used in substantial amounts, optionally and preferably in combination with a non-zein protein ingredient, to produce a food product dough that can be processed to a finished (dried and expanded) food product, with the finished food product having useful or highly desirable mechanical, taste, and textural properties.

The food product contains a major amount of starch in combination with the zein protein ingredient. Starch can be present from a flour ingredient that includes a combination of starch and protein, which may be zein protein (e.g., in corn flour) or non-zein protein. The food product will also contain a zein protein ingredient, which is a concentrated non-zein protein composition separate from a flour ingredient. Optionally and preferably the food product can contain a non-zein protein ingredient, which is a concentrated non-zein protein composition that is separate from and in addition to flour or the flour component.

The food product can be prepared by combining any of various food ingredients such as a flour component (e.g., one or a combination of flour ingredient, starch ingredient, non-zein protein ingredient), with a zein protein ingredient. As used herein, the term "ingredient" refers to a composition that is combined with one or more other ingredients to form a dough as described herein, that can be processed by expansion to a finished food product. The term "starch ingredient" refers to a concentrated starch composition as defined herein. The term "protein ingredient" refers to a concentrated protein composition as defined herein. Each of these "ingredients" refers specifically to a concentrated composition of starch or protein, respectively, that is separate from "flour" (i.e., a "flour ingredient") as that term is used herein. Likewise, the terms "non-zein protein ingredient" and "zein protein ingredient" refer to a concentrated non-zein protein composition and a zein protein composition, respectively, separate from "flour" as that term is used herein.

Consistent therewith, the terms "protein," "zein protein," and "non-zein protein" (as opposed to the terms "protein ingredient," "zein protein ingredient," and non-zein protein ingredient") are used to refer to these chemically defined constituents as part of an ingredient or as part of a dough or food product (regardless of the origin of the constituent in the dough or food product, e.g., regardless of whether the protein, zein protein, or non-zein protein was presented to the food product (e.g., dough composition) as part of a flour ingredient or as part of a zein protein ingredient or a non-zein protein ingredient, etc.). Thus, as an example, a dough may contain non-zein protein that is present as part of a flour ingredient, that is present as part of a non-zein protein ingredient, or that is present as a constituent of a different ingredient; the total amount of non-zein protein in the dough or a derivative food product is the total of non-zein protein present from all sources, i.e., the total amount of non-zein protein present in the dough or food product due to its presence in the flour ingredient, plus the non-zein protein ingredient, plus non-zein protein that may be present in any other ingredient that contains non-zein protein.

The term "ingredient" is likewise used for other ingredients that contain a concentrated constituent of a dough or food product that is added to a dough, as compared to the constituent itself. For example, a "fat ingredient" is a concentrated fat composition that is added separately or with other ingredients when forming a dough, while the term "fat" refers to the constituent itself (i.e., a fat as that term is used in the chemical and food arts), such as when referring to an amount of total fat present in an ingredient, or in a dough composition, or a food product, regardless of the source of the fat (e.g., from a fat ingredient or from a flour ingredient).

A flour component of a food product as described can be any suitable flour, combination of two or more flours, or a combination of starch ingredient and protein ingredient with an optional amount of flour. The term "flour" (also, "flour ingredient") is used herein in a manner consistent with its understood meaning in the food and baking arts, generally referring to a dry powder composition prepared by milling or grinding a flour grain such as corn, wheat, oats, etc., with the ground or milled powder composition containing protein and starch from the original flour grain in relative amounts that are comparable to the amounts of starch and protein in the original flour grain. The flour can be whole grain flour, wheat flour, corn flour, cornmeal, or a flour ingredient derived from flour grain with some portions of grain such as the bran or germ removed.

In addition to flour ingredient, or as a complete or partial replacement to flour ingredient, a food product as described can include "composite," "synthetic," or "reconstituted" flour, these terms referring to a combination of two separate ingredients that combine to provide starch and protein in amounts similar to a flour ingredient. The ingredients are "isolated" or "concentrated" starch ingredient (or simply "starch ingredient"), and "isolated" or "concentrated" protein ingredient (or "protein ingredient") (e.g., a non-zein protein ingredient). The combination of starch ingredient, protein ingredient (especially non-zein protein ingredient) and optional flour ingredient can be included in the food product in amounts that provide amounts of protein and starch that are comparable to amounts of protein and starch in a "flour ingredient" or in a flour grain such as wheat, corn, oats, or another flour grain. As used herein, the term "flour component" refers to one or a combination of ingredients that includes one or more of: "flour" (i.e., "flour ingredient") derived from a flour grain and containing both starch and protein from the flour grain; starch ingredient; and protein ingredient (especially non-zein protein ingredient).

Typically, a food product as described can include between about 40 and about 80 weight percent flour component, e.g., from about 50 to about 75 weight percent flour component, such as from about 55 to 70 weight percent flour component, based on total weight food product (dry, meaning on a dry basis).

Flour (i.e., a flour ingredient) for use in the flour component can be any conventional flour (e.g., wheat flour, corn flour, oat flour), an analog thereof, or any flour having a composition that is consistent with the present description. Examples include commercially available corn, wheat, and oat flours such as those referred to as "all-purpose" flour ("plain" flour), whole corn flour, corn meal, whole wheat flour, and the like. Such a flour can include major amounts of starch and protein. The amounts of protein and starch in a flour component can depend on the grain from which the flour is derived, or the flour which a composition flour is intended to mimic or replace, with exemplary (non-limiting) ranges including: from 60 to 90, e.g., from 85 to 80 weight percent starch; from about 5 to 15 weight percent protein (e.g., corn flour contains from about 5 to 10 weight percent protein); less than 2 weight percent fat; and small amounts of sugar, fiber, enzymes, vitamins, and minerals, based on total weight of the flour.

For a flour component that is made entirely of or that includes a portion of composite flour in combination with a flour ingredient (e.g., that is entirely starch ingredient combined with protein ingredient, or that contains flour combined with one or both of a starch ingredient and a protein ingredient) the combination of starch ingredient, protein ingredient, and optional flour that is considered to make up the flour component can contain from 60 to 90, e.g., from 85 to 80 weight percent starch; from about 5 to 15 (e.g., 5 to 10) weight percent protein, based on the total combination of starch ingredient, protein ingredient, and flour in the flour component.

Optionally, in addition to the amount of starch present in a food product (i.e., added to a dough) as part of a flour component, a food product as described may include starch ingredient, which means a composition that includes a high concentration of one or more types of starch, e.g., at least 70, 80, 90, 95, 98, or 99 weight percent starch based on total weight in the starch ingredient (on a dry basis). The starch ingredient may be derived from any plant or other starch source, such as from wheat, corn, potato, rice, tapioca, oat, barley, millet, bananas, sorghum, sweet potatoes, rye, as well as other cereals, legumes, and vegetables. The amount of starch ingredient in a food product (other than starch ingredient of a flour component) can be as desired for a particular food product. In various food product embodiments, the amount of starch ingredient can be relatively low, such as less than 10, 5, 3, 2, or 1 weight percent starch ingredient based on total weight of the food product (dry). According to certain embodiments, the food product does not contain any added starch ingredient, or contains not more than a significant amount of starch ingredient, such as less than 0.5 or 0.1 weight percent starch ingredient based on total weight food product (dry).

The amount of total starch, from all sources, in a food product can be as desired, and is typically in a range from about 40 to about 70 weight percent starch, e.g., from 45 to 65 weight percent starch, based on total weight food product (dry).

Protein will be present in a flour component, including non-zein protein (and, possibly, zein protein), depending on the type of flour ingredient. According to embodiments of the invention, non-zein protein ingredient can be added as an ingredient of a food product (i.e., added to a dough), in addition to any non-zein protein present in a flour component, to supplement the amount of protein in the food product, i.e., for nutritional enhancement. A non-zein protein ingredient is a concentrated composition that includes a high concentration of non-zein protein, e.g., at least 70, 80, 90, 95, 98, or 99 weight percent non-zein protein based on total weight solids in the non-zein protein ingredient. The non-zein protein may be derived from any plant or other protein source, such as from dairy (e.g., whey), soy, wheat, fish, eggs, poultry, legume, or from another grain or animal source. Specific examples of non-zein protein ingredients include vital wheat gluten (VG), pea protein isolate (PPI), whey, and soy protein isolate (SPI).

The amount of the non-zein protein ingredient in a food product can be as desired. Based on the presence of zein protein ingredient in the food product, and its improvement in processing of a dough and of textural or mechanical properties of a finished food product, the food product may contain a relatively high amount of total protein, meaning a relatively high amount of protein of all types (zein and non-zein protein) and from all sources and ingredients. An example food product may contain total protein in an amount up to about 40 weight percent total protein based on total weight of the food product (on a dry basis), e.g., at least 25, 30, or up to about 40 percent total protein (dry). As part of the total protein, various embodiments of the described food product may contain up to about 30, e.g., up to about 25, 20, or up to or greater than 15, 10, or 5 weight percent non-zein protein ingredient based on total weight of the food product (dry).

According to the present invention, zein protein, especially in the form of a zein protein ingredient, is included in a dough composition and finished food product in an amount that will improve a property of a dough as described, for processing (e.g., expansion ratio), or that will provide a desired mechanical property or textural characteristic of a finished food product, e.g., reduced bulk density, hardness, or desired crispiness or crunchiness (e.g., as measured by peak count and peak size, described herein), relative to a food product that is otherwise identical in composition and processing, but that does not include the zein protein.

Zein protein ingredient may be from any source, e.g., derived from corn by being extracted and recovered from corn or co-products of corn processing, such as for ethanol. The composition and characteristics of a zein protein ingredient may depend substantially on the process used on the corn and the method of zein recovery, including in certain recovery processes a solvent for an extraction step. Two major types of corn processing are wet milling and dry milling, either process being useful for producing a zein protein ingredient for use in a food product of the present description. Wet milling begins with steeping the corn in the presence of reduced sulfur, such as sulfite, to loosen the pericarp, followed by milling and separation of the major components such as germ, endosperm, pericarp, and protein. The corn proteins are divided between the steep liquor and the byproduct corn gluten meal (CGM). Dry milling is carried out without steeping, and in the case of ethanol production, preliminary separation of corn components is not typically done. Corn Gluten Meal from the wet milling process is a typical starting material for zein extraction due to its high protein content (sixty percent or greater). However, the sulfite or other chemicals that may be used during the preparation (e.g., in a steeping process) of CGM may adversely affect zein quality. Approximately forty to fifty percent of the total protein in corn is zein, or about four percent of the corn kernel on a dry basis.

Zein protein can be categorized into four types: alpha-zein, beta-zein, gamma-zein, and delta-zein. Each zein type has a different amino-acid profile and exhibits slightly different physical properties. Zein as a corn substituent includes all four types, with alpha-zein being present at about seventy percent of total zein. Beta-zein accounts for about five percent of the zein in corn. Gamma-zein accounts for approximately twenty to twenty-five percent of the zein in corn, and delta-zein accounts for about one to five percent of the zein in corn.

Zein protein ingredient for use as described herein can contain a range of relative amounts of the different zein forms, as are typical or available. Some useful zein ingredients include high amounts of alpha-zein and low amounts of the other types. One such zein protein ingredient is FREEMAN zein, primarily of the alpha-zein form, e.g., a zein protein ingredient that includes at least 80 weight percent alpha-zein protein based on total weight zein protein (solids). Other useful zein protein ingredients can include higher relative amounts of the beta-zein and gamma-zein. Examples are described in United States Patent Publication 2015/0201647, and are referred to therein as "alpha-beta-gamma-containing zein" compositions. As one specific example described in the '674 publication, a useful zein protein ingredient may include from 40 to 88 weight percent alpha-zein, and from 12 to 60 weight percent combined beta-zein and gamma-zein, based on total weight zein protein in the protein ingredient (dry). As another example, a useful zein protein ingredient may include from 55 to 70 weight percent alpha-zein, from 2 to 8 weight percent beta-zein, and from 5 to 25 weight percent gamma-zein. Other relative amounts of the different forms of zein will also be useful.

A useful zein protein ingredient can be any concentrated zein composition that includes any useful combination of the alpha-, beta-, gamma-, and delta-zein forms. The amounts of each form of zein in a protein ingredient can be amounts that allow the zein protein ingredient to be processed into a food product as described, including an expanded food product that has useful or advantageous processing and end product properties such as expansion ratio, bulk density, and textural properties, as well as flavor.

The amount of total zein protein (from all sources), and the amount of zein protein ingredient, in a food product as described, can be any useful amounts that will provide useful processing of a dough and useful structure, textural properties, flavor, etc., of a finished food product, as described. Because zein protein is not known to be of high nutritional value, the amount of zein protein or zein protein ingredient may not be one that is maximized relative to other ingredients, but instead may be chosen to enhance processing properties of the dough or physical properties (e.g., bulk density, textural characteristics) of the food product. Other ingredients may be desired in the food product to increase nutritional value, such as non-zein protein ingredient (to obtain a desired level of nutritional protein), bran (to reduce calories or to increase fiber), or some bran and some non-zein protein (nutritional protein).

The food product may contain any useful amount of zein protein or zein protein ingredient. Useful amounts (on either basis) can be selected based on the type and character of the food product being prepared, including features such as taste, nutritional requirements, and physical (e.g., mechanical, cosmetic, textural) properties thereof. An amount of zein protein that can be useful for producing an expanded food product is any amount that in combination with other ingredients is sufficient to produce a dough capable of being extruded to produce an expanded and then dried food product that includes a dried matrix that includes the zein protein. By way of example, a useful dough for preparing an expanded food product (and the expanded food product itself) may include at least 3 weight percent zein protein (from all sources), e.g., from about 5 to 40 weight percent zein protein, based on a total weight of the dough or food product on a dry basis; preferred amounts may be in a range from about 5 to about 25, e.g., from 5 to about 20, or from about 5 to about 15 weight percent zein protein based on total weight of the dough or food product on a dry basis. Depending on the amount of zein protein in a flour component of a dough or finished food product, the dough or finished food product may include an additional amount of zein protein in the form of a zein protein ingredient. The amount of zein protein ingredient can be an amount that, with other dough ingredients, results in zein protein being present in the dough or finished food product in an amount as described. A useful amount of zein protein ingredient may be, for example, at least 3 weight percent zein protein ingredient, e.g., from 5 to 40 weight percent zein protein ingredient, based on a total weight of the dough or finished food product on a dry basis; preferred amounts may be in a range from about 5 to about 25, e.g., from 5 to about 20, or from about 5 to about 15 weight percent zein protein ingredient based on total weight dough or finished food product on a dry basis.

The food product may contain other ingredients, as desired, to provide desired taste or to contribute to processing, texture, freshness, etc. For example, sugar may be included as desired, depending on the type of food product, at a relatively low amount, such as below about 10, 5, 3, 2, or 1 weight percent sugar (from all sources) based on total weight food product (dry). Sugars include fructose, sucrose, glucose, etc.

Fat may be present in any useful amount, typically an amount that does not exceed about 10, 5, 3, 2, or 1 weight percent fat (from all sources) based on total weight food product (dry). According to certain specific embodiments of food products as described, fat ingredient may be included in only a low amount, such as less than 2 or 1 weight percent fat ingredient based on total weight food product (dry). In some food product embodiments the presence of low levels of fat has been found to allow for an improved expansion ratio and improved (reduced) bulk density in a food product, as those properties are improved due to the presence of zein protein or zein protein ingredient, as described herein.

According to certain embodiments, the food product can contain relatively low amounts of gluten, or may be considered to be "gluten-free," e.g., can contain no concentrated gluten ingredient and no gluten-containing ingredients, e.g., may contain less than 1 percent, e.g., less than 0.5 or 0.3 weight percent total gluten based on total weight of the food product on a dry basis.

According to the invention, a food product is prepared to include zein protein in an amount that provides desired or improved processing or textural properties relative to food products of comparable formulations but without the zein protein, or relative to food products of comparable formulations that include an amount of non-zein protein ingredient instead of zein protein ingredient; e.g., zein protein ingredient may improve textural properties by being included as a partial or complete replacement for non-zein protein ingredient.

Expanded food products are popular among consumers because of their convenience and because of their appetizing flavor and textural properties. The texture of an expanded food product is highly dependent on the cell structure of the expanded food piece, i.e., cell walls of a matrix structure of the food piece. The number of cells, the cell size, and the thickness of the cell walls contribute to the texture of the finished product. The cellular structure affects the amount of force required to break the food during mastication. It also affects the intensity and the frequency of the fracture events happening during chewing. Depending on the number and the intensity of the fracture events, the consumer will describe the food as either crispy or crunchy. For example, breakfast cereal foods tend to have tight cellular structure and are therefore crunchy. Corn-based cheesy puffed snacks typically have an airier cell structure and thinner cell walls and are perceived as crispy foods.

To prepare an expanded food product as described, ingredients of the food product are first combined to form a dough with an amount of water that is useful for processing the dough by expansion. The dough is then processed to a finished (e.g., puffed) food product. To form the dough, the ingredients are combined, including a flour component (either flour or an analogous composite flour or synthetic flour made to contain comparable amounts of protein and starch ingredient), water, zein protein ingredient, optional non-zein protein ingredient, and other optional food ingredients (e.g., sugar, fiber, flavors, etc.) to make a dough that can be processed by expansion into a food product. The dough can include solid ingredients in amounts and ratios that are useful for processing, and that will provide a finished food product having desired mechanical, textural, and organoleptic properties. Optional ingredients include concentrated non-zein protein ingredient, a starch ingredient, fiber, fat (e.g., solid fat or oil), and one or more flavorants such as sugar, cheese, or other natural or artificial flavor, and other optional additives and preservatives as desired. The relative amounts of each of these food ingredients can be selected to achieve desired flavor, texture, mechanical properties (hardness, bulk density, crunch, crispiness, etc.), and nutritional value in the finished food product, as well as processing properties (e.g., expansion ratio) and mechanical properties (e.g., viscosity) of the dough for processing.

A puffed food product as described can be in the form of an individually formed food piece that includes a solid and dried matrix (which may include some amount of water) that defines numerous openings or "cells" (air pockets or open spaces) interspersed between walls that form a matrix that defines the cells, giving the expanded food piece a high porosity and reduced density. The matrix is made of the expanded and typically dried dough. The dried food piece is preferably "self-supporting," meaning that each piece is sufficiently dry and rigid to support its own weight. Examples of commercial expanded, low density snack or cereal products include those available as Baked Cheetos®, Puffed Cheetos®, and similar expanded corn-based cheesy snack foods, as well as Kix® and Cheerios® brand breakfast cereals. Example puffed, extruded, or expanded snack food products, and methods of their preparation, are described in United States patent and Patent Publication Numbers U.S. Pat. Nos. 6,797,213; 6,722,873; 2006/0019009; 2011/0200736; and 2013/0040040, the contents of which are incorporated herein by reference in their entireties.

A finished expanded food product has a water content that is sufficiently low to exhibit crisp or frangible mechanical properties, and to be self-supporting. Water can be present in a dried food product or dried food piece as described herein at any useful concentration, with exemplary amounts of water being in a range from about 1 to about 7 weight percent, e.g., from about 2 to about 5 weight percent, based on the total weight of the dried food product or piece. The amount of water may vary depending on the desired composition and physical properties of the dried food product or food piece.

An expanded food product that contains zein protein as described may be produced by any known or developed method of preparing a water-containing dough, and processing the dough at elevated temperature, pressure, and shear by use of an extruder, or that is "gun puffed," fried, directly expanded, or otherwise caused to expand to a reduced bulk density during processing. An amount of volatilizable agent such as water or other plasticizing agent (e.g., a polyhydric alcohol such as glycerol or the like) can be included in the dough in an amount to allow the dough to flow under pressure through an extruder as a dough composition, followed by extrusion and expansion of the dough at the extruder opening (e.g., die). The amount of water in a dough may be any amount that is useful to allow for processing by expansion. Example amounts may be from about 13 to about 30 weight percent water based on total weight of the dough (water and solids), but other amounts may also be useful.

In an extrusion method, an extruder passes a dough under pressure and at an elevated temperature through a die or other opening. Volatilizable agent, generally the water component of the dough, alternately steam, can become depressurized upon the dough exiting the extruder, causing the volatilizable agent to expand, which in turn causes the dough to expand and form the cell-containing structural matrix. Certain exemplary methods of preparing a puffed extruded food product are described in U.S. Pat. No. 6,607,772, the entirety of which is incorporated herein by reference. That document describes extruding a dough that contains water, corn meal, and other desired ingredients through a die having a small orifice, at high pressure, to form an expanded extrudate. The extrudate flashes off its inherent and added moisture, or puffs, as it exits the small orifice, thereby forming an expanded (puffed) extrudate upon reaching atmospheric pressure after extrusion.

For extrusion methods, any suitable food extruder can be used, such as a single or twin screw extruder. The extruder heats the dough to a temperature sufficient to allow for desired flow, with exemplary operating ranges being at least about 95 degrees Fahrenheit. The pressure in the extruder can be any pressure useful to allow the dough to flow through the extruder and through the extruder opening to produce a desired extruded and expanded food product; examples of useful pressures may be at least about 200 or 400 pounds per square inch, up to about 700 or 800 pounds per square inch. The heated and pressurized dough can be forced through an extruder opening, upon which the heated water in the dough forms steam due to the pressure reduction upon exiting the extruder, resulting in an expansion or puffing of the extruded dough. The volumetric expansion at the extruder opening may be as desired, for example expansion by an amount of at least 2 times the size of the extruder opening. Also upon this expansion, the expanded dough may be cut, formed, or shaped, e.g., molded, into a desired shape and desired dimensions.

The product after extrusion, expansion, and optional cutting and shaping into an expanded dough piece can be dried by any known method to reduce water content. Before or after drying, the extruded food pieces may be processed by application of a coating, if desired, such as a flavor coating. The coating can be applied by any useful method such as by spraying, tumbling, or any other suitable application technique.

EXAMPLES

The quality of an extruded (expanded) food product in terms of mechanical properties, including textural properties, density, and product expansion (during expansion), can be evaluated using different parameters: Expansion ratio, bulk density (relates to the density and the cellular structure of a puffed or extruded product), and texture analysis, which provides information relating to the sensory attributes of an expanded food product and information relating to the cellular structure of the product as well.

Bulk Density

Bulk density of the following example food products was determined by volumetric displacement of food pieces using mustard seeds. The volume of an empty sample cup was first determined by filling the cup with mustard seeds. The cup was gently tapped against a countertop 10 times. Mustard seeds were added until the cup overflowed and the excess mustard seeds were removed using a ruler. The seeds were then transferred to a graduated cylinder, which was tapped against a counter 20 times to fill void spaces. The volume of the cup was recorded ($V_1$). A mass ($M_{ext}$) of sample extruded food product was weighed. The sample cup was filled with the mustard seeds and the sample food product. After the cup was almost full, it was tapped against a countertop 10 times. Mustard seeds were added until the cup overflowed and the excess mustard seeds were removed using a ruler. The contents of the cup were then transferred into a container and food product was carefully removed. The mustard seeds were transferred into the graduated cylinder which was tapped against the countertop as described earlier and the volume occupied by the seeds was recorded as ($V_1$). The volume occupied by the food product was calculated as follows:

Volume of the sample food product (milliliters)=$V_1$−$V_2$.

The bulk density of the food product was determined as:

Bulk Density (grams/milliliter)=$M_{ext}$(grams)/volume of sample food product (milliliters).

Each bulk density measurement was performed in triplicate and there results were taken as an average of the three trials.

Texture Analysis

Texture is an important sensory attribute of expanded food products. It is a one of the main drivers of consumer liking. Sensory analysis is the best way to evaluate the texture of food products but it is too costly to be used as a screening tool for large amounts of samples. Instrumental texture analysis is a cost effective way of assessing the texture of crispy foods and has been shown to be related to sensory attributes. Texture analysis was performed using a TA.XT.plus Texture Analyzer (Texture Technologies, Scarsdale, N.Y.). The texture analyzer (TA) was calibrated for force and height. The TA was fitted with a TA-4 probe (1.5" diameter, acrylic probe, 20 mm tall). The TA settings were as follows:

Test mode: Compression
Pre-test speed: 2 mm/s
Test seep: 1 mm/s
Post-test speed: 10 mm/s
Trigger force: 5 grams
Target mode: Strain
Strain: 70%

A single expanded food piece was placed on the platform of the TA and the compression test was performed. Texture analysis was replicated 5 times. An example of a readout of an analysis of a food piece is shown at FIG. 1, with indications of hardness and peaks, for purposes of peak count peak size.

The hardness (kg) is the maximum force recorded during the test and represents the amount of force required to crush the sample during mastication. The peak count is a unitless measurement of the number of "peaks" that occur during a measurement. A peak may be identified as an occurrence of an increase in measured force that meets a certain minimum magnitude. As measured, a peak was identified at every instance of at least 50 gram increase in force (other minimum readings can alternately be used). The number of total peaks in a measurement is indicative of the crispiness of the product; the more peaks, the crispier the product. The peak size is the average offset (force) for all the peaks (of at least 50 gram increases) recorded during the test. The average peak size provides information relating to the thickness of the cell walls (thin cell walls generate small peaks and inversely, thicker cell walls generate larger peaks) and is related to the bulk density of the sample. Different specific values of product expansion, bulk density, and texture characteristics, of an expanded food product, can be desired, in part, based on the type of product being prepared. A puffed product such as Kix® cereal breakfast or Cheetos® cheese puffs, will have a low hardness, a high peak count and a low peak size. In comparison, a food product similar to Cheerios® cereal product will have a higher hardness, a lower peak count and a higher average peak size.

Example 1

Concentrated zein protein is extracted using aqueous ethanol, with or without sodium hydroxide to generate different zein forms. Zein extracted using ethanol consists primarily of alpha zein (Zein product 1). The use of sodium hydroxide during the extraction allows co-extraction of beta and gamma zeins at relatively higher amounts (Zein product 2).

All samples were extruded using an experimental-scale, Plasti-Corder, Model PL 2000 extruder from C.W. Brabender. The extruder is a single screw extruder fitted with a 38 cm barrel. The die head was fitted with a 4 mm diameter die. The screw has a compression ratio of 3:1. A baseline cereal made of whole corn flour, corn meal, salt, and sugar was developed. The recipe for this model cereal is shown in table 1 (Recipe 1). The optimum extrusion conditions to produce a control extrudate (no added protein ingredient) were identified as: feed moisture content 13.6%, barrel temperature profile of 80-145-145° C., and screw speed of 165 rpm. All the products were extruded using these conditions.

The objective of the experiment was to compare the performance of different protein ingredients during the extrusion process. To do so, different protein ingredients were added to the recipe in different amounts, and the quality attributes of the different extruded products were compared to each other. Extruded products were prepared for each of Recipes 2, 3, and 4, using different amounts of four different protein ingredients:

Zein product 1 (A-Zein)
Zein product 2 (BG-Zein)
Vital wheat gluten (VG)
Soy protein isolate (SPI).

TABLE 1

Quantities in grams for each recipe

| Ingredients | Recipe 1 | Recipe 2 (5% protein ingredient) | Recipe 3 (15% protein ingredient) | Recipe 4 (25% protein ingredient) |
| --- | --- | --- | --- | --- |
| Whole corn flour | 510 | 510 | 510 | 510 |
| Corn meal | 370 | 370 | 270 | 170 |
| Granulated sugar | 100 | 50 | 50 | 50 |
| Salt | 20 | 20 | 20 | 20 |
| Protein ingredient[1] | 0 | 50 | 150 | 250 |

[1]Each Recipe was prepared with four protein ingredients: Zein product 1, Zein product 2, Vital wheat gluten, and Soy protein Isolate It was challenging to extrude the doughs that contained the soy protein isolate. The material had trouble flowing through the extruder. Because of these problems we were unable to collect an extruded product made with 15% soy protein isolate. The product made with 25% soy protein was very inconsistent; because of uneven flow through the extruder, some extrudates were puffed while others resembled sticks. The expansion ratio and the bulk density were measured on each sample. The results for the expansion ratio are shown in Table 2, and bulk densities are shown in Table 3.

TABLE 2

Expansion ratios of the extrudates

| Zein content | A-zein | BG-zein | VG | SPI |
| --- | --- | --- | --- | --- |
| 0% | 2.13 | 2.06 | 2.1 | 2.04 |
| 5% | 2.57 | 2.51 | 2.63 | 2.3 |
| 15% | 2.59 | 2.62 | 2.44 | n/a |
| 25% | 2.99 | 2.78 | 2.31 | 1.75 |

TABLE 3

Bulk density of extrudates (g/mL)

| Zein content | A-zein | BG-zein | VG | SPI |
| --- | --- | --- | --- | --- |
| 0% | 0.2224 | 0.3495 | 0.2673 | 0.2608 |
| 5% | 0.1624 | 0.1814 | 0.2051 | 0.2237 |
| 15% | 0.1758 | 0.1345 | 0.2241 | n/a |
| 25% | 0.1279 | 0.1267 | 0.2706 | 0.256 |

The addition of either type of concentrated zein protein helped to increase the expansion and decreased the bulk density of the extrudates. There was a linear increase in expansion and a linear decrease in bulk density as the amount of the zein protein ingredient in the extrudate increased. The addition of VG, on the other hand, increased the expansion in comparison to the control but it had no impact on the bulk density of the product. The extrudates made with high amounts of SPI had low expansion. The extrudates made with 25% zein protein ingredient were much less dense than those made with VG or SPI.

Example 2

Soy is a complete protein but it causes problems during extrusion. Therefore it is challenging to produce extrudates that contain high levels of soy protein. The finished product is often hard and unappealing to consumers. Zein protein, on the other hand, is considered a "low-quality" protein because it lacks 2 of the 9 essential amino acids, lysine and tryptophan. But as described herein, can provide improved processing and finished product properties. By combining, zein protein ingredient with and amount of soy protein ingredient, in specific ratios, a food product may contain desired amounts of nutritional protein, e.g., protein requirements set by the U.S. Code of Federal Regulations, and also be processable and have desired finished product properties. The addition of zein protein ingredient to soy-based or high protein extrudates can improve quality attributes of the finished food product, which in turn makes them more appealing to consumers.

The experimental extruder described in Example 1 was used to develop a soy protein extrudate containing 17.5% percent soy protein isolate. The extruder was fitted with a 38 cm barrel, the die head was fitted with a 3 mm die and the screw had a compression ratio of 3:1. A response surface design was used to identify the optimum procession condition needed to produce such extrudate. The feed moisture content was adjusted to 15.5%, the barrel temperature to 135° C., and the screw speed to 150 rpm.

In this Example, zein protein ingredient was added to the recipe, also containing soy protein ingredient. The zein protein ingredient was a beta-gamma zein that contains approximately 23% combined β,γ-zein by weight, and 77% α-zein. The recipes are detailed in Table 4.

TABLE 4

Quantities in gram for each recipe

| Ingredients | Recipe 5 | Recipe 6 | Recipe 7 |
| --- | --- | --- | --- |
| Whole corn flour | 510 | 510 | 510 |
| Salt | 20 | 20 | 20 |
| Sugar | 50 | 50 | 50 |
| Soy protein isolate | 175 | 175 | 175 |
| Zein protein ingredient | 0 | 50 | 100 |
| Corn meal | 245 | 195 | 145 |

The expansion ratio, bulk density and texture analysis were measured to evaluate the extrudates. The expansion ratios and bulk densities are shown in table 5.

TABLE 5

Expansion ratio and bulk density upon addition of zein protein ingredient

|  | Zein protein ingredient | Expansion ratio | Bulk Density (g/mL) |
|---|---|---|---|
| Recipe 5 | 0% | 2.45 | 0.2778 |
| Recipe 6 | 5% | 2.59 | 0.2639 |
| Recipe 7 | 10% | 2.65 | 0.2065 |

The addition of zein protein ingredient significantly improved the end product characteristics (expansion ratio, bulk density, textural properties, see table 6).

Adding 10% zein protein ingredient, significantly decreased the hardness of the extrudates. Adding of 5% zein protein ingredient significantly increased the crispiness of the product. The addition of zein protein ingredient did not have an impact of the peak size, suggesting that the thickness of the cells wall remained unchanged.

TABLE 6

Textural characteristics with addition of zein protein ingredient

|  | Zein content | Hardness (kg) | Peak count | Peak size (kg) |
|---|---|---|---|---|
| Recipe 5 | 0% | 2.5 | 37.2 | 0.33 |
| Recipe 6 | 5% | 2.31 | 47 | 0.3 |
| Recipe 7 | 10% | 2.15 | 44.6 | 0.31 |

Example 3

An extruded product containing 25% soy protein isolate was produced using the experimental extruder described in example 1. The extruder was fitted with a 38 cm long barrel, a 3 mm die, and a screw with a compression ratio of 3:1. A response surface design was used to determine the optimum extrusion conditions to produce a high protein soy extrudate with acceptable characteristics. The recipe for the soy extrudate is shown in table 7 below. To produce, these extrudates, the feed moisture content was adjusted to 18% moisture, the barrel temperature profile to 80-150-150° C. and the screw speed was set at 185 rpm.

TABLE 7

Quantities in gram for the 25% soy protein extrudate

| Ingredient | Quantities |
|---|---|
| Whole corn flour | 510 |
| Corn meal | 170 |
| Sugar | 50 |
| Salt | 20 |
| Soy protein isolate | 250 |

In this Example the zein protein ingredient used to improve the textural characteristics of the extrudates consisted primarily of alpha zein and contained a small amount of combined beta and gamma zein (approximately 95-96% α-zein and 4-5% of combined βγ-zein). The zein protein ingredient was added to the recipe at 3 different levels (5, 10 and 15%). The same extrusion conditions were used for each extrudate, and the quality attributes of the zein/soy extrudates were compared to the control soy extrudates. The recipes are shown in Table 8.

TABLE 8

| | Recipes | | |
|---|---|---|---|
| Ingredient | Recipe A (5% zein) | Recipe B (10% zein) | Recipe C (15% zein) |
| Whole corn flour | 510 | 510 | 510 |
| Corn meal | 120 | 70 | 20 |
| Sugar | 50 | 50 | 50 |
| Salt | 20 | 20 | 20 |
| Soy protein isolate | 250 | 250 | 250 |
| Zein ingredient (primarily alpha zein) | 50 | 100 | 150 |

Figure 2:
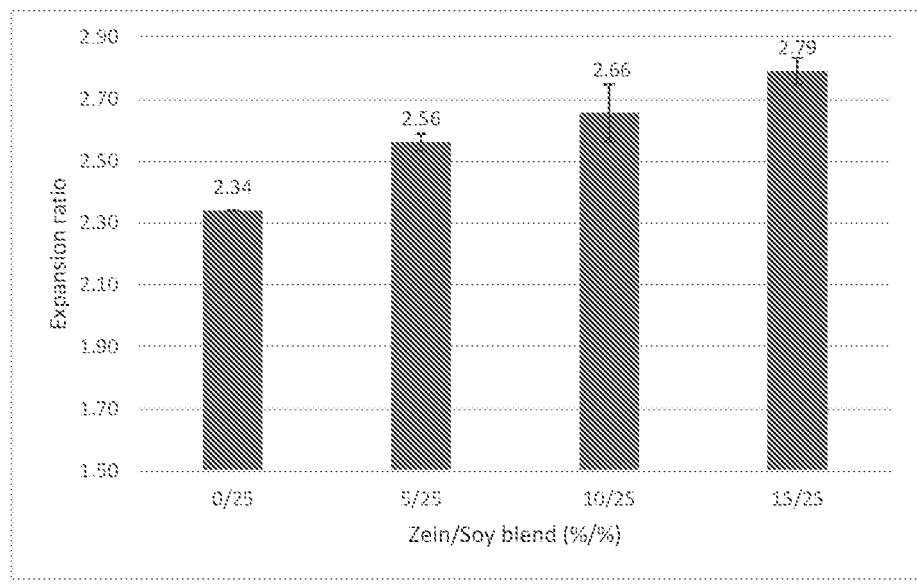
FIG. 2 shows data relating to expansion ratio relative to protein ingredient.
Figure 3:
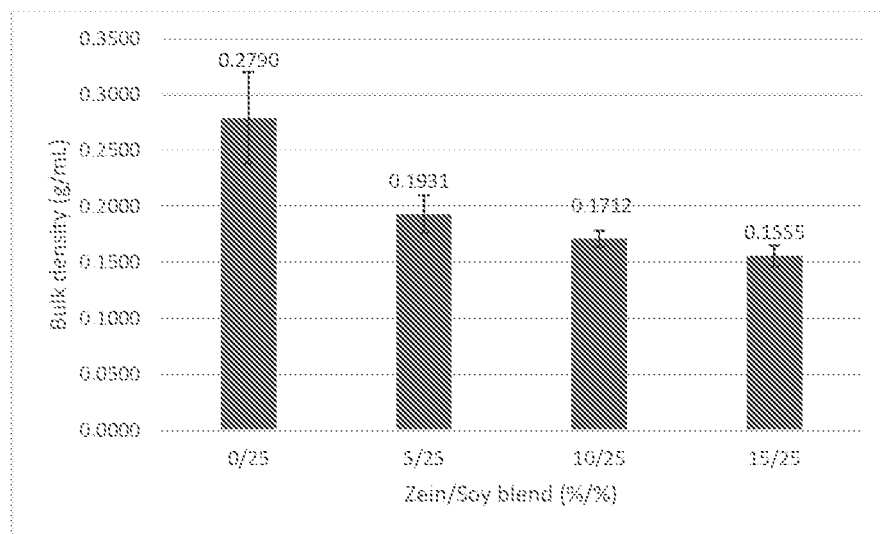
FIG. 3 shows data relating to bulk density relative to protein ingredient content.
Figure 4:
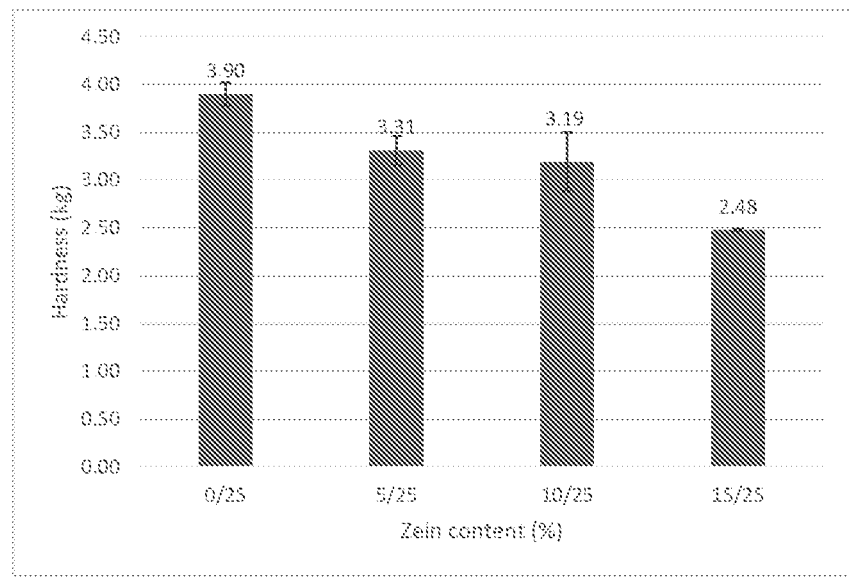
FIG. 4 shows data relating to hardness relative to protein ingredient content.
Figure 5:
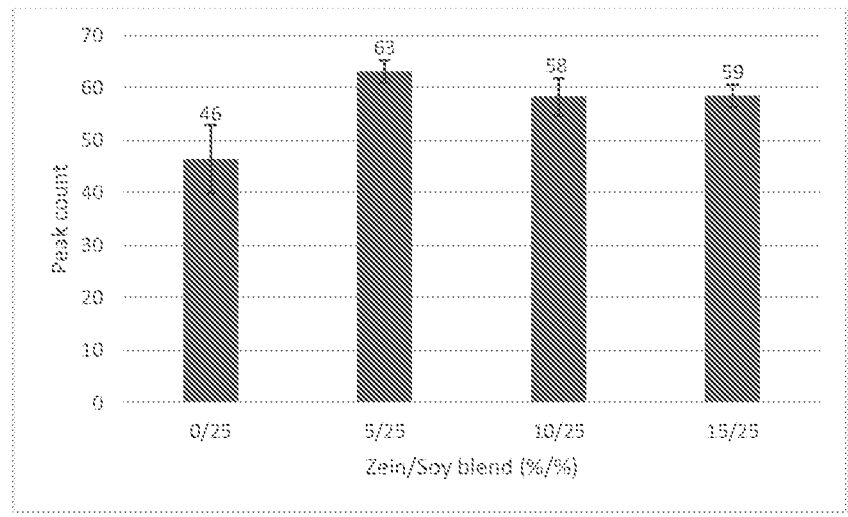
FIG. 5 shows data relating to crispiness (peak count) relative to protein ingredient content.
Figure 6:
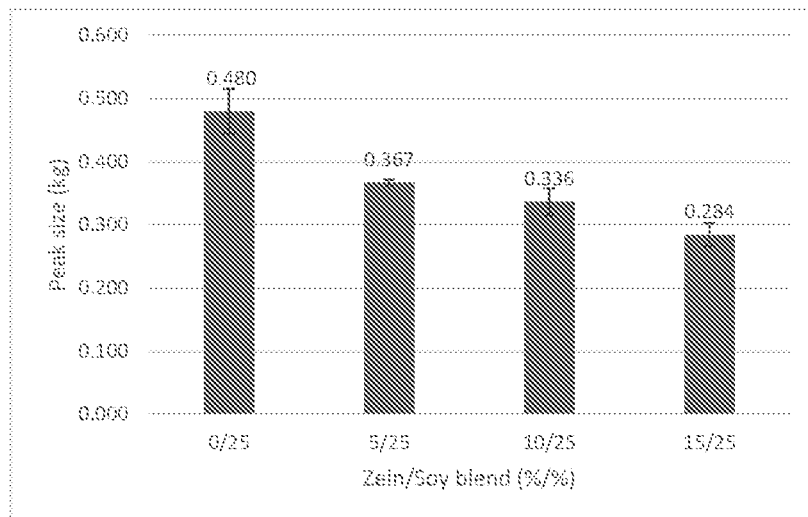
FIG. 6 shows data relating to crispiness (peaks size) relative to protein ingredient content.

FIGS. 2, 3, 4, 5 and 6 below show that adding 5 to 15% of zein ingredient to the recipe significantly increased the quality attributes of the extruded products. FIG. 2: Change in expansion ratio upon addition of zein. FIG. 3: Changes in bulk density upon the addition of zein. FIG. 4: Changes in hardness upon addition of zein. FIG. 5. Changes in crispiness (peak count) upon addition of zein. FIG. 6. Changes in peak size (cell wall thickness) upon the addition of zein.

As shown in these figures, adding 5 to 15% zein ingredient significantly increased the expansion in comparison to the control. The addition of 5% zein protein ingredient increased the expansion by 9.4% while the addition of 15% zein protein ingredient increased the expansion by 19%. The addition of zein protein ingredient also increased the overall peak count, suggesting that the products containing zein protein ingredient were crispier than the product that did not contain the zein protein ingredient. The addition of any amount of zein protein ingredient increased the peak count (crispiness) by 30.5%. The addition of just 5% zein protein ingredient reduced the bulk density by 44%. The addition of zein protein ingredient also significantly reduced the product hardness. Finally, the addition of zein protein ingredient significantly reduced the peak size, indicating that the extrudates made from soy/zein protein ingredient blends were crispier.

Example 4

In Example 3, it was demonstrated that it is possible to improve the textural characteristics of soy protein extrudate by adding zein protein ingredient to the recipe. It was not necessary to modify the extrusion conditions to improve the quality attributes of the finished product.

In the present example, the extrusion conditions were adjusted using a definitive screening design. The recipes used for this experiment are shown in tables 7 and 8. An extruded product containing 25% soy protein isolate was produced as described in example 3. The feed moisture content was adjusted to 18% moisture, the barrel temperature profile to 80-150-150° C. and the screw speed was set at 185 rpm. Results from the definitive screening design suggested that the best extrusion conditions to produce high quality extrudates from zein/soy blends were:

Feed moisture content: 15%
Barrel temperature profile: 80-125-125° C.
Screw speed: 200 rpm The extrudates were characterized by determining the expansion ratio, bulk density, and texture characteristics.

Figure 7:
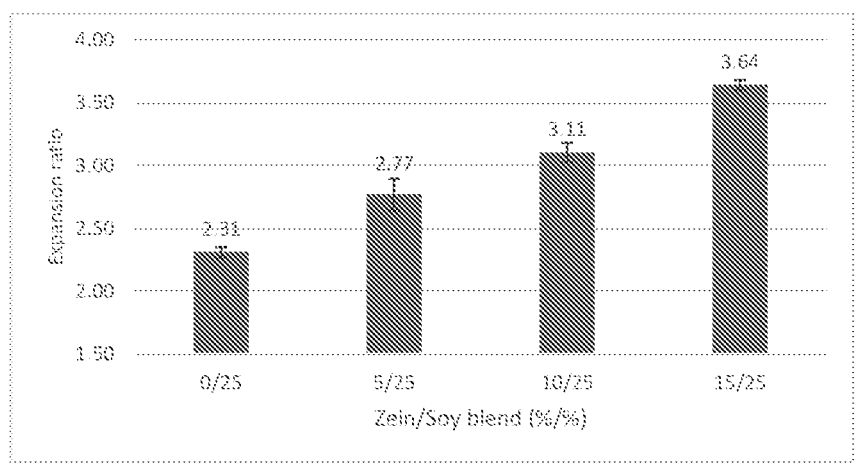
FIG. 7 shows data relating to expansion ratio relative to protein ingredient content.
Figure 8:
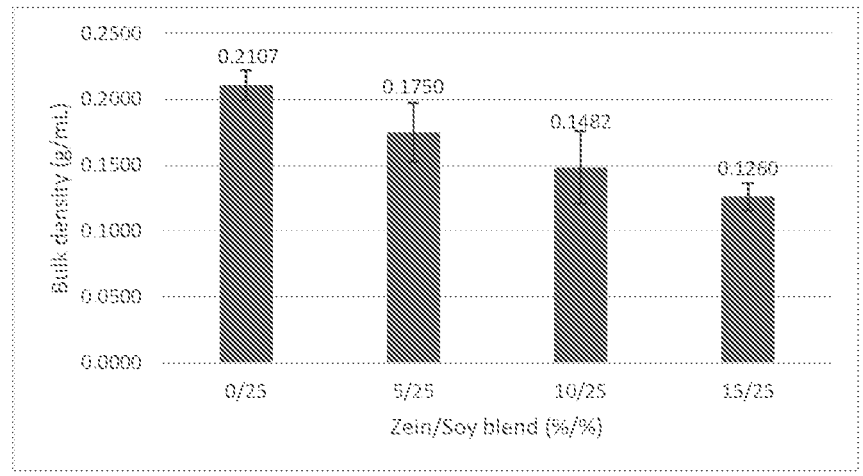
FIG. 8 shows data relating to bulk density relative to protein ingredient content.
Figure 9:
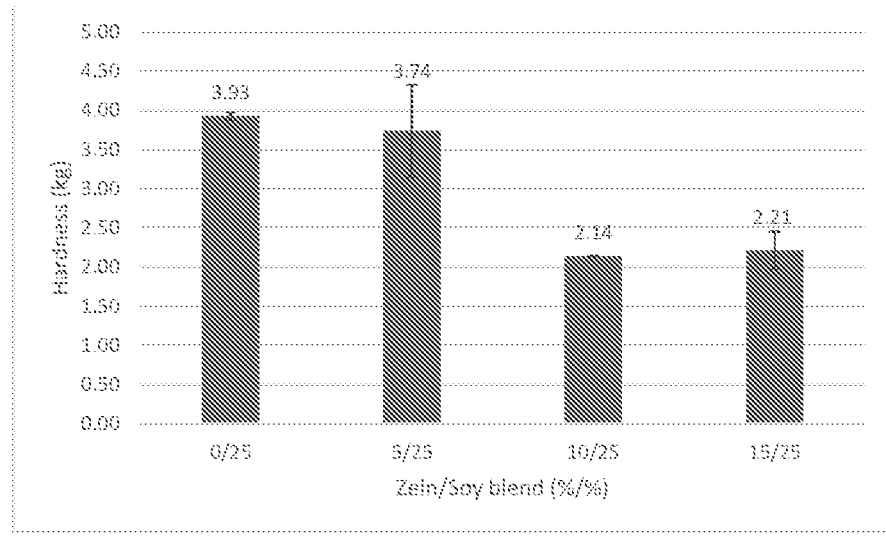
FIG. 9 shows data relating to hardness relative to protein ingredient content.
Figure 10:
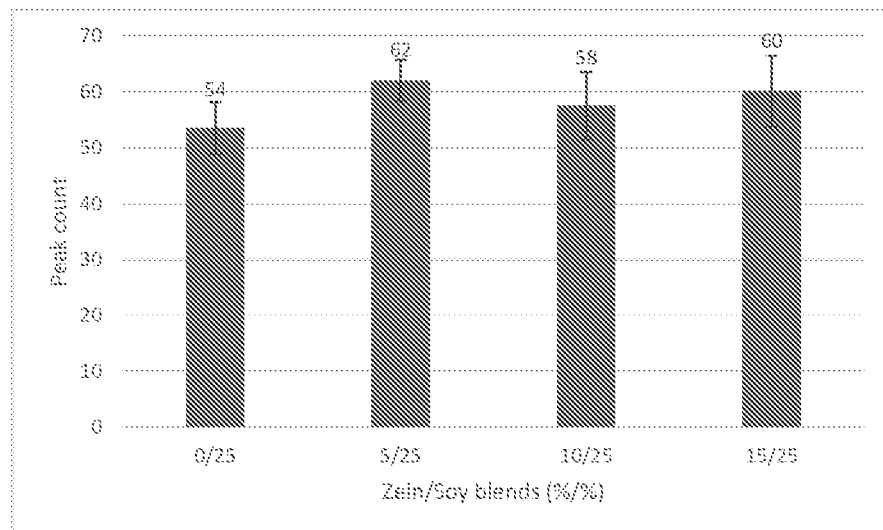
FIG. 10 shows data relating to crispiness (peak count) relative to protein ingredient content.
Figure 11:
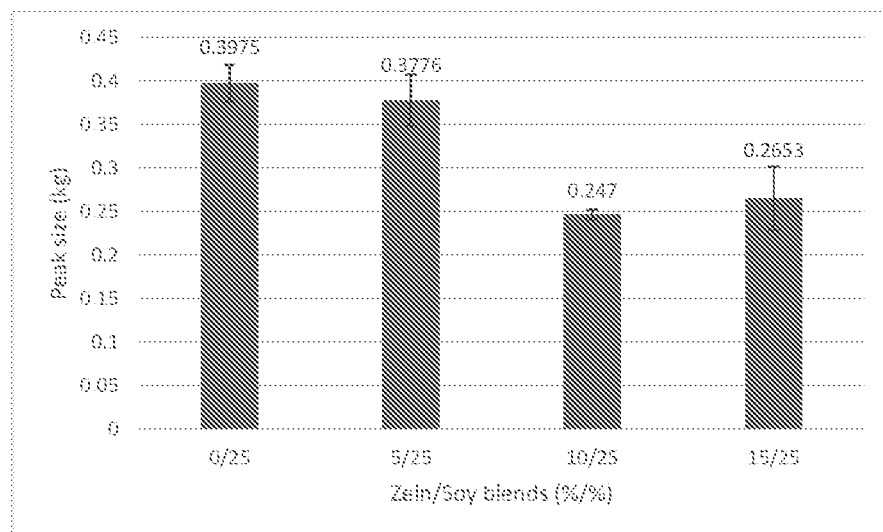
FIG. 11 shows data relating to crispiness (peaks size) relative to protein ingredient content.

Adjusting the extrusion conditions resulted in improved processing by expansion of the product: adding 5% of the zein protein ingredient increased the expansion ratio by 19% and the addition of 15% increased the expansion ratio by 63% (FIG. 7). There was a linear decrease in bulk density with the increase in amount of zein protein ingredient (FIG. 8). The addition of at least 10% zein protein ingredient decreased the product hardness by 83.6% (FIG. 9). The addition of zein protein ingredient increased the peak count by 11% on average (FIG. 10). Finally the addition of at least 10% zein protein ingredient significantly decreased the peak size (FIG. 11).

Overall, the addition of 5 to 15% zein protein ingredient enhanced the quality attributes of the soy/zein protein ingredient-containing extrudates.

The invention claimed is:

1. A puffed extruded food product comprising:
    flour component comprising starch,
    from 3 to less than 15 weight percent zein protein ingredient based on total weight food product (dry), wherein the zein protein ingredient contains a concentrated amount of zein protein, and wherein the zein protein ingredient is effective to reduce hardness of the puffed extruded food product,
    from 5 to 30 weight percent non-zein protein ingredient based on total weight food product (dry),
    from about 10 to about 40 weight percent total protein based on total weight food product (dry), and
    from 40 to 70 weight percent starch, based on total weight food product (dry).

2. The food product of claim 1 wherein the non-zein protein ingredient contains at least 70 weight percent non-zein protein based on total weight non-zein protein ingredient (solids).

3. The food product of claim 1 wherein the non-zein protein ingredient is from 10 to 30 weight percent non-zein protein ingredient, based on total weight food product (dry).

4. The food product of claim 1 wherein the non-zein protein ingredient is from 5 to 25 weight percent non-zein protein ingredient, based on total weight food product (dry).

5. The food product of claim 3 wherein the zein protein ingredient includes at least 80 weight percent alpha-zein protein, based on total weight zein protein (solids).

6. The food product of claim 3 wherein the zein protein ingredient includes from 40 to 88 weight percent alpha-zein and from 12 to 60 weight percent combined beta-zein and gamma-zein, based on total weight zein protein (dry).

7. The food product of claim 3 wherein the zein protein ingredient contains from 55 to 70 weight percent alpha-zein, from 2 to 8 weight percent beta-zein, and from 5 to 25 weight percent gamma-zein.

8. The food product of claim 1 comprising not more than 2 weight percent fat, based on total weight zein protein (dry).

9. The food product of claim 1 comprising:
    from 50 to 70 weight percent flour component, and
    from 20 to 30 weight percent non-zein protein ingredient separate from the flour component,
    based on total weight food product (dry).

10. The food product of claim 1 wherein the food product is a dough containing from about 13 to about 30 weight percent water based on total weight dough.

11. The food product of claim 1 wherein the food product is an expanded food product containing from about 1 to about 7 weight percent water based on the total weight of the food product.

12. A method of preparing a puffed extruded food product, the method comprising:
    providing a dough comprising:
        flour component comprising starch,
        from 5 to 30 weight percent non-zein protein ingredient based on total weight dough, wherein the non-zein protein ingredient comprises non-zein protein having a lysine content that is higher than that of zein protein, and
        from 3 to less than 15 weight percent zein protein ingredient, based on total weight dough, the zein protein ingredient containing a concentrated amount of zein protein, and
    extruding the dough to form a puffed extruded food product,
    wherein the zein protein ingredient is effective to reduce hardness of the puffed extruded food product.

13. The method of claim 12 wherein the dough comprises:
    at least 40 weight percent flour component, based on total weight food product (dry).

14. The method of claim 12, wherein the dough comprises:
    from 40 to 70 weight percent starch,
    from about 10 to about 40 weight percent total protein, and
    from 5 to 25 weight percent non-zein protein ingredient, based on total weight food product (dry).

15. The method of claim 12 wherein the dough comprises not more than 2 weight percent fat, based on total weight zein protein (dry).

16. The method of claim 12 wherein the dough comprises:
    from 50 to 70 weight flour percent component, and
    from 5 to less than 15 weight percent zein protein ingredient,
    from 20 to 30 weight percent non-zein protein ingredient separate from the flour component,
    based on total weight food product (dry).

17. The food product of claim 1 wherein the zein protein ingredient includes from 40 to 88 weight percent alpha zein protein based on total zein protein.

18. The food product of claim 1 having an expansion ratio of at least 2.2.

19. The food product of claim 1 wherein non-zein protein in the non-zein protein ingredient has a higher solubility in water than the zein protein in the zein protein ingredient.

20. The food product of claim 1 wherein non-zein protein in the non-zein protein ingredient has a lysine content that is higher than that of zein protein.

21. The food product of claim 1 wherein non-zein protein in the non-zein protein ingredient is selected from: whey, soy, wheat, fish, egg, poultry, and legume.

22. The food product of claim 1 wherein the non-zein protein ingredient comprises at least 70 weight percent non-zein protein based on total weight non-zein protein ingredient (solids), wherein the non-zein protein is selected from: whey, soy, wheat, fish, egg, poultry, and legume.

23. The food product of claim 22 wherein the non-zein protein ingredient is selected from: vital wheat gluten, pea protein isolate, whey, and soy protein isolate.

24. The method of claim 12 wherein non-zein protein in the non-zein protein ingredient has a higher solubility in water than the zein protein in the zein protein ingredient.

25. The method of claim 12 wherein the non-zein protein ingredient comprises non-zein protein is selected from: whey, soy, wheat, fish, egg, poultry, and legume.

26. The method of claim 12 wherein the non-zein protein ingredient contains at least 70 weight percent non-zein protein based on total weight non-zein protein ingredient (solids), wherein the non-zein protein is selected from: whey, soy, wheat, fish, egg, poultry, and legume.

27. The method of claim 26 wherein the non-zein protein ingredient is selected from: vital wheat gluten, pea protein isolate, whey, and soy protein isolate.

28. The food product of claim 1 wherein the zein protein ingredient contains at least 70 weight percent zein protein based on total weight zein protein ingredient (solids).

29. The method of claim 12 wherein the zein protein ingredient contains at least 70 weight percent zein protein based on total weight zein protein ingredient (solids).

* * * * *